United States Patent
Schütz

[11] Patent Number: 6,050,437
[45] Date of Patent: Apr. 18, 2000

[54] TRANSPORT AND STORAGE CONTAINER FOR LIQUIDS

[75] Inventor: Udo Schütz, Selters-Westerwald, Germany

[73] Assignee: Protechna S.A., Fribourg, Switzerland

[21] Appl. No.: 09/115,804

[22] Filed: Jul. 15, 1998

[30] Foreign Application Priority Data

Jul. 23, 1997 [DE] Germany .......................... 197 31 518

[51] Int. Cl.[7] ...................................................... B65D 6/00
[52] U.S. Cl. ........................ 220/4.12; 220/3.4; 220/485; 220/495.01
[58] Field of Search ............................... 200/495.01, 9.4, 200/9.1, 485, 4.12

[56] References Cited

U.S. PATENT DOCUMENTS

| | | | |
|---|---|---|---|
| 4,676,373 | 6/1987 | Schnziden | 220/9.4 |
| 5,289,937 | 3/1994 | Boots | 220/9.4 |
| 5,437,384 | 8/1995 | Farrell | 220/9.4 |
| 5,653,354 | 8/1997 | Olson | 220/9.4 |

FOREIGN PATENT DOCUMENTS

| | | |
|---|---|---|
| 7341620 | 11/1973 | Germany . |
| 3214940 | 12/1982 | Germany . |
| 8519765 | 11/1985 | Germany . |
| 195 11 723 C1 | 8/1996 | Germany . |

*Primary Examiner*—Joseph M. Moy
*Attorney, Agent, or Firm*—Friedrich Kueffner

[57] ABSTRACT

A transport and storage container for liquids includes a pallet-like underframe, an exchangeable inner container of synthetic material with four side walls, a bottom wall and a top wall, a closeable inlet opening at the top and a lower outlet opening with a draining device, and an outer casing surrounding the inner container, wherein the outer casing is formed of vertically and horizontally extending grate rods of metal. The transport and storage container for liquids further includes a fabric-like, net-like or lattice-like sheathing of an electrically conductive material which is applied onto the inner container and surrounds the inner container completely or partially.

6 Claims, 1 Drawing Sheet

6,050,437

TRANSPORT AND STORAGE CONTAINER FOR LIQUIDS

BACKGROUND OF THE INVENTION

1. Field of the Invention

The present invention relates to transport and storage containers for liquids with a pallet-like underframe, an exchangeable inner container of synthetic material with four side walls, a bottom wall and a top wall, a closeable inlet opening at the top and a lower outlet opening with a draining device, and with an outer casing surrounding the inner container, wherein the outer casing is formed of vertically and horizontally extending grate rods of metal.

2. Description of the Related Art

When liquid containers of this type known from DE 195 11 723 C1 are filled and emptied and when liquids are stirred in this type of containers, for example, for mixing purposes, electric charges may occur at the container surfaces as a result of liquid friction. The principal danger of electrostatic charging is the fact that ignition sources come into contact with explodable mixtures of gases and vapors.

Because the electrostatic charging capability of the inner container of synthetic material, transport and storage containers of the aforementioned type cannot be used in explosion-endangered rooms and cannot be filled with explosive liquids.

In accordance with a possibility for preventing electrostatic charging of containers of synthetic glass fiber described in DE-Z Kunststoffe, Volume 59, 1969, Issue 12, pages 838–842, an electrically conductive lattice is embedded in the wall of the container.

DE 85 19 765.3 U1 discloses flexible transport containers of textile for bulk materials. For avoiding electrostatic charges, the flexible wall material of the containers is provided with a coating which is composed of a metal layer or metal strips and a binding agent with electrically conductive particles embedded in the binding agent.

DE 73 41 620 U1 describes storage tanks for flammable liquids of synthetic class fiber material with an electrically conductive lattice integrated in the cylindrical wall and the floor of the container for preventing electrostatic charging.

DE 32 14 940 A1 discloses foils having properties intended to keep away electrostatic charges. Such foils are suitable for packaging electronic circuit components which must be protected against the harmful influence of an electrostatic charge. The foil originally has a relatively high surface resistance, but is rendered capable of keeping away static charges by imprinting thereon a matrix pattern with the use of electrically conductive printing ink in such a way that on the printed surface are formed at least a first and a second group of conductor paths arranged at a distance from each other, wherein the paths of the groups intersect each other.

SUMMARY OF THE INVENTION

The invention is based on the object of improving the construction of the aforementioned type of transport and storage container for liquids in such a way that an electrostatic charging of the inner container of synthetic material is avoided when filling the containers with liquids and when draining the liquids from the containers.

In accordance with the invention, this object is met by a transport and storage container for liquids provided with a fabric-like, net-like or lattice-like sheathing of an electrically conductive material which is applied onto the inner container and surrounds the inner container completely or partially.

In a transport and storage container for liquids which is equipped with an inner container of synthetic material, an outer casing formed by vertical and horizontal grate rods of metal, and a pallet-like underframe, the invention is based on arranging a fabric-like, net-like or lattice-like sheathing of an electrically conductive material, preferably metal, on the inner container, so as to completely or partially surround the inner container, so that electric charges which may be formed on the surfaces of the inner container of synthetic material due to liquid friction when filling and emptying the transport and storage container, and when storing liquids in this container, for example, for mixing purposes, can be discharged to the ground through the sheathing, the outer casing and the pallet-like underframe which also is composed of an electrically conductive material.

The electric grounding of the inner container of synthetic material makes it possible to use the transport and storage container as a dangerous material container for combustible liquids, such as paints, varnishes and solvents, with a flash point of <35° C., and the use of the container in work rooms in which an explosive atmosphere may be formed by gases, vapors or mists.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

The single FIGURE of the drawing is a perspective view of a transport and storage container.

DESCRIPTION OF THE PREFERRED EMBODIMENTS

Figure 1:
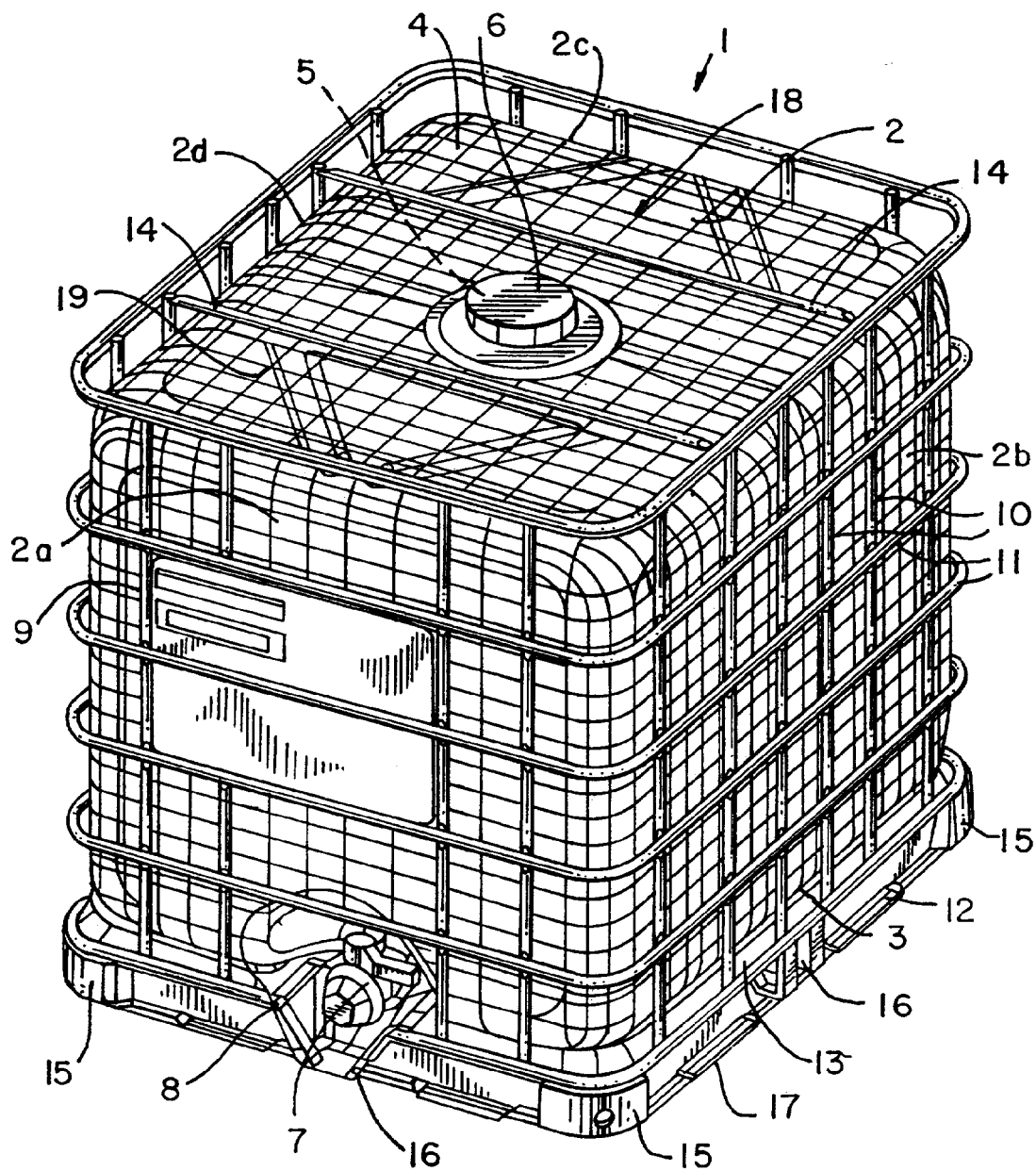

The transport and storage container 1 for liquids which can be used as a disposable container and a reusable container includes as principal structural components a replaceable parallelepiped inner container 2 of polyethylene with four side walls 2a–2d, a bottom wall 3 constructed as a draining bottom, an upper wall 4 with an inlet connection 5 and an outlet connection 7 with a drain cock 8, an outer casing 9 of intersecting vertical and horizontal grate rods 10, 11 of metal, a pallet-like underframe 12 with a bottom basin of sheet metal for receiving with frictional engagement the inner container 2 of synthetic material, and cover struts 14 of metal for protecting the inner container 2.

The bottom basin 13 rests with a certain bottom clearance on corner and middle legs 15, 16 and a bottom frame 17 or skids, so that the gripping arms of a transport device, for example, a fork lift, can be moved from four sides under the bottom basin 13 for transporting the transport and storage container 1. The legs 15, 16 and the bottom frame 17 or the skids are of metal or an electrically conductive synthetic material, for example, polyethylene with a conductive soot portion. The pallet-like underframe 12 of the transport and storage container 1 has length and width dimensions conforming to European standards.

Applied onto the inner container 2 of synthetic material is a sheathing 18 of an electrically conductive material in the form of a lattice basket or lattice hood 19 of thin metal wire having a mesh width smaller than 100×100 mm.

Additional sheathing 18 of the inner container 2 of synthetic material of the transport and storage container 1 can be formed by a net or a fabric of metal or an electrically conductive synthetic material, wherein the additional sheathing 18 are wound or pulled around or over the inner container 2.

While specific embodiments of the invention have been shown and described in detail to illustrate the inventive principles, it will be understood that the invention may be embodied otherwise without departing from such principles.

I claim:

1. A transport and storage container for liquids, comprising a pallet-like underframe, an exchangeable inner container mounted on the underframe, the inner container comprising four side walls, a bottom wall and a top wall, an upper closeable inlet opening and a lower outlet opening with a draining device, an outer casing surrounding the inner container, the outer casing being comprised of vertical and horizontal grate rods of metal, further comprising a sheathing of an electrically conductive material applied on the inner container of synthetic material, wherein the sheathing is of one of a fabric, a net and a lattice and at least partially surrounds the inner container.

2. The container according to claim 1, wherein the sheathing is of metal.

3. The container according to claim 1, wherein the sheathing is of an electrically conductive synthetic material.

4. The container according to claim 1, wherein the sheathing is comprised of a lattice hood of thin metal wire placed on the inner container of synthetic material.

5. The container according to claim 1, wherein the sheathing is comprised of an electrically conductive net or fabric wound or pulled over the inner container.

6. The container according to claim 1, wherein the sheathing has a mesh width of smaller than 100×100 mm.

* * * * *